Patented Nov. 7, 1922.

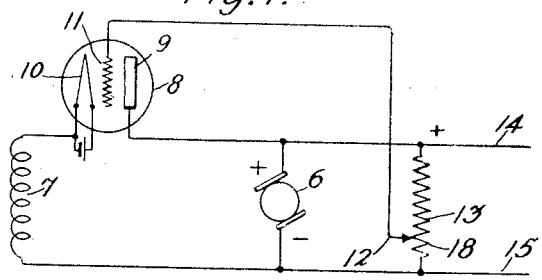
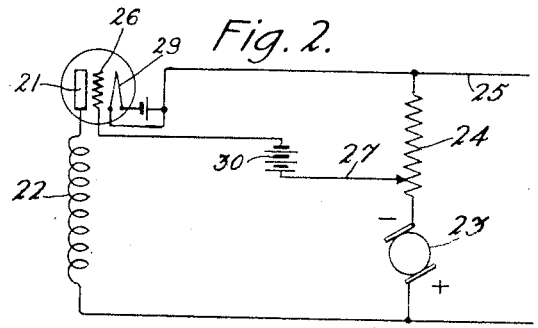
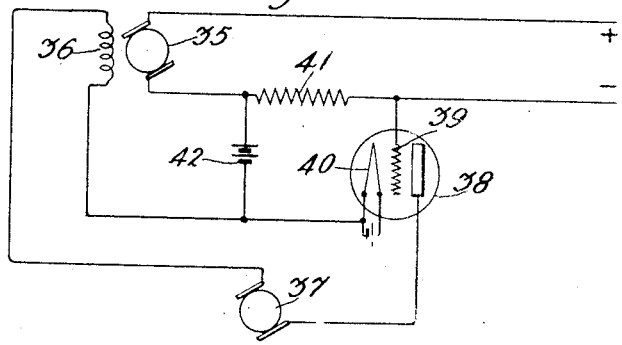
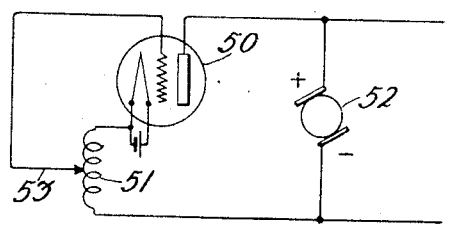

1,434,869.

UNITED STATES PATENT OFFICE.

PETER IRVING WOLD AND OLIVER E. BUCKLEY, OF EAST ORANGE, NEW JERSEY, ASSIGNORS TO WESTERN ELECTRIC COMPANY, INCORPORATED, OF NEW YORK, N. Y., A CORPORATION OF NEW YORK.

ELECTRIC REGULATOR.

Application filed August 21, 1918. Serial No. 250,883.

*To all whom it may concern:*

Be it known that we, PETER IRVING WOLD and OLIVER E. BUCKLEY, citizens of the United States, both residing at East Orange, in the county of Essex and State of New Jersey, have invented certain new and useful Improvements in Electric Regulators, of which the following is a full, clear, concise, and exact description.

This invention relates to a novel type of regulator which is applicable in general for the regulation of electric circuits, and is particularly adapted to be employed for regulating the electrical output such as the voltage or current of a generator, or for controlling the electrical energy applied to a motor in order that its speed may be regulated.

An object of this invention is to produce a regulator for electric generators, which will maintain a constant voltage or a constant current output. Another object is to produce such a regulator as will be continuously acting and in which there will be no moving parts, such as are present in relays and the like. Still another object is to provide a regulator that is light in weight and which may be readily employed as a regulator for an electric machine without the necessity of altering the machine's construction.

The regulator provided according to the present invention is of the thermionic type, such as an audion comprising a vacuum tube containing electrodes. The manner in which such a vacuum tube is employed as a regulator is this: The vacuum tube comprises a cathode which serves as a source of electrons that travel to the anode or plate electrode. The amount of this electron stream or space current depends upon several factors, primarily upon (*a*) the voltage applied between these electrodes, (*b*) the temperature of the cathode, an increase in temperature producing a stronger space current, and (*c*) the potential of the grid electrode with respect to the filament, the more positive the potential of the grid within certain limits, the greater will be the space current.

An important feature of this invention is that such a vacuum tube as above described is an amplifier, that is, the application of a given voltage on the grid is more effective in controlling the impedance of the tube, as measured between the cathode and anode electrodes, than the application of the same voltage applied between the two last mentioned electrodes. On account of its amplifying properties a vacuum tube of the three-electrode type is therefore well adapted to regulate the current or voltage of a circuit with great sensitiveness.

If it is desired to regulate the output of a generator in accordance with this invention, the field winding thereof may be connected in circuit with the cathode and plate electrodes. The output of the generator depends of course upon the field current which, within limits, is controlled by the current flowing between the cathode and plate electrodes and which may be varied in intensity by varying the potential applied to the grid. An increase in the voltage or current of the generator serves to vary the potential of the grid, thereby modifying the space current so that the desired regulation is obtained.

As a thermionic device may be associated with an electric machine in a variety of ways, several forms that this invention may possess are hereinafter described in detail in connection with the drawings in which Fig. 1 shows one embodiment of this invention where a vacuum tube of the three-electrode type is shown connected in series with the field winding of a self-excited shunt-wound generator for regulating for constant voltage, while Fig. 2 shows such a tube associated with a shunt-wound generator in such a manner as to regulate for constant current; Fig. 3 shows how this invention may be employed to regulate a separately excited generator for constant current; and Fig. 4 is a modification of Fig. 1.

Referring more particularly to Fig. 1, 6 is a direct current generator having in series with its field winding 7 a vacuum tube 8 of the three-electrode type, so connected that the anode 9 is positive with respect to the cathode 10. The auxiliary electrode or grid 11 is connected by tap 12 to a point of the high resistance 13.which is connected across the leads 14 and 15 of the generator.

As is well known in the art, the intensity of the current flow between the anode and cathode of tube 8 depends upon the value of the potential applied to the grid, the less negative or the more positive the grid, the greater will be the space current flowing between the anode and cathode. Since the tube 8 is in series with the field winding 7, the field winding current and consequently the output voltage of the generator depends upon the potential of the grid 11 and may be controlled thereby. The potential of the grid 11 depends upon the difference between the I R drop in the field winding 7 and the I R drop in that part 18 of resistance 13 which is at a lower potential than tap 12. Tap 12 should be so adjusted that the value of resistance 18 is such that the potential drop across the field winding is preponderant, thereby making the grid negative with respect to the cathode 10 for the normal value of the output voltage of the generator. As soon, however, as the value of this output voltage would tend to change, there would be a corresponding change in the potential of the grid and the value of the field current in such a way as practically to annul the voltage change. Thus if the voltage from the generator 6 would tend to increase, due for example to a change in speed of the generator or a change in its load, the current through the field winding would tend to increase, thereby making the I R drop in the field winding greater and making the grid more negative with respect to the cathode, so that the field current would be cut down due to an increase in the internal impedance in the tube 8. It follows, therefore, that due to the control of the field current by the tube 8, the generator 6 will deliver substantially a constant voltage across the leads 14, 15.

In some cases it may not be necessary to connect the grid tap 12 to a point on the resistance 18, in which case it could be connected directly to lead 15. Resistance 18 would then not be necessary and the potential of the grid would be determined solely by the I R drop in the field winding 7. It is furthermore not essential that the vacuum tube should be placed in the circuit at the particular point shown in Fig. 1, but the tube may be placed elsewhere, providing that there is always a point of lower potential than the filament to which the grid may be connected.

Fig. 2 shows how such a scheme as above described may be employed to regulate for constant current. A tube 21 is shown in series with the field winding 22 of a generator 23 in such a manner that the anode is positive with respect to the filament. A resistance 24 is placed in series with the generator between its negative terminal and the lead 25, to which resistance the grid 26 is connected by tap 27. 30 is a source of voltage for the grid. The potential of the grid with respect to the cathode 29 is therefore determined by the algebraic sum of the voltage from source 30 and the I R drop across that part of resistance 24 between lead 25 and the tap 27. If now the current output of the generator tends to increase, due for example to a variation in speed of the generator, the change in the I R drop in resistance 24 would change the potential of the grid 26, correspondingly changing the field current and consequently keeping the output current of the generator substantially constant. If, however, the current output would tend to decrease, the grid would become less negative with respect to the filament, thereby decreasing the impedance of the tube, increasing the field current and consequently restoring the output current of the generator to its normal value.

While the arrangement of Fig. 2 operates essentially for current control, there is also a tendency to control the voltage output as well, since part of the I R drop in resistance 24 is due to the field current of the generator, so that any change in the field current would tend to change the potential of the grid. This dependency of the grid potential upon the field winding current would, as described under Fig. 1, tend to keep the voltage output constant.

Fig. 3 shows this invention applied to a separately excited direct current generator for regulating for constant current. 35 is a generator having a field winding 36 supplied with current from a source such as direct current generator 37. In series with the field winding 36 and source 37 is a vacuum tube 38. Between the grid 39 and the cathode 40 of this tube is a resistance 41 which is also included in one of the output leads of the generator 35. 42 is an additional source of voltage for the grid 39. Vacuum tube 38 is therefore responsive to changes in the output current of generator 35. The potential of the grid 39 with respect to the cathode 40 is therefore determined by the voltage of the source 42 and the I R drop in resistance 41. If now the output current from generator 35 tends to increase, due for example to a change in source 37 or the speed of the generator, the I R drop across the terminals of resistance 41 would increase, thereby making the grid more negative and cutting down the amount of current supplied to the field winding 36 and restoring the output current to its original value. Obviously, a decrease in the output current would make the grid more positive with respect to the cathode, thereby increasing the current through field winding 36.

In the modification of Fig. 4 a vacuum tube 50 is inserted in series with the field winding 51 of a generator 52 in a manner similar to that in Fig. 1, but the grid of the tube is shown connected to a point of the field winding by a tap 53. The grid is therefore negative with respect to the cathode of the tube by the I R drop across that part of the field winding included between the grid and the filament. The grid will therefore be responsive to changes in the voltage of the generator, since a change in the output voltage of generator 52 would tend to produce changes in the field winding current, which changes, however, would be practicaly annulled by the action of the grid.

It will be noted that in all embodiments of the invention herein described, the filament is provided with the usual constant potential heating battery whereby the thermionic activity of the filament will be substantially constant.

It is obvious that this invention is not limited in its applications and forms to those above described, but that various modifications may be made therein as will occur to anyone skilled in the art without departing in any wise from the spirit of this invention, as defined in the appended claims.

What is claimed is:

1. An electric circuit comprising an electric generator having a field winding and means for regulating a characteristic of said generator, said means comprising a vacuum tube having an anode, a cathode and a control electrode, said anode and said cathode being connected in series with said field winding with respect to the output terminals of said generator, and a connection to a point in said circuit having a potential intermediate the potential of the output terminals of said generator such that a portion at least of said field winding is included in circuit between said cathode and said control electrode and such that an increase in voltage of said generator causes the control electrode to become more negative with respect to said cathode by an amount dependent upon the drop in potential in a portion of said field winding.

2. An electric circuit comprising an electric machine having a field winding, a vacuum tube having an anode, a cathode and a control electrode, said anode and said cathode being connected in circuit with said field winding, a resistance element in circuit with said machine, and a connection from said control electrode to a point in said circuit such that the drop in potential across said resistance controls the potential difference between said control electrode and said cathode.

3. In combination, an electric machine having a field winding, supply leads connected to said machine, a high resistance element in shunt to said supply leads, a vacuum tube having an anode, a cathode and a control electrode, said anode and cathode being connected in series with said field winding, and a connection from said control electrode to an intermediate point on said resistance element.

4. The combination in a system of electrical distribution, of a dynamo electric machine having an exciting winding and a three-electrode electroionic device having an anode connected to the positive terminal of said machine, a cathode connected to the negative terminal of said machine through said exciting winding, and a control electrode connected to such a point in the distribution system that an increase of voltage at the terminals of the machine will produce a decrease in the current through said exciting winding.

5. The combination in a system of electrical distribution, of a dynamo electric machine having an exciting winding and a three-electrode electroionic device having an anode connected to the positive terminal of said machine, a cathode connected to the negative terminal of said machine through said exciting winding, and a control electrode connected to such a point in the distribution system that said control electrode will normally be negative with respect to said cathode.

In witness whereof I hereunto subscribe my name this 28th day of August, 1918, at New York, New York, U. S. A.

PETER IRVING WOLD.

In witness whereof I hereunto subscribe my name this 27th day of September, 1918.

OLIVER E. BUCKLEY.